United States Patent [19]

Bailey

[11] Patent Number: 4,699,627

[45] Date of Patent: Oct. 13, 1987

[54] INDIGO-DYEABLE POLYESTER FIBERS AND PRETREATMENT OF POLYESTER TO PRODUCE SAME

[75] Inventor: Bobby J. Bailey, Candler, N.C.

[73] Assignee: Akzona Incorporated, New York, N.Y.

[21] Appl. No.: 473,489

[22] Filed: Mar. 9, 1983

[51] Int. Cl.$^4$ .............................................. C09B 67/00
[52] U.S. Cl. .......................................... 8/602; 8/581; 8/606; 8/653; 8/922
[58] Field of Search .................... 8/495, 581, 653, 602, 8/606

[56] References Cited

U.S. PATENT DOCUMENTS

| | | | |
|---|---|---|---|
| T100,201 | 1/1981 | Logullo | 8/495 |
| 3,504,998 | 4/1970 | Speier | 8/581 |
| 3,527,556 | 9/1970 | Riley | 8/17 |
| 3,793,341 | 2/1974 | Genta | 8/653 |
| 3,960,479 | 6/1976 | Tsujimoto et al. | 8/650 |
| 4,313,732 | 2/1982 | Teaque et al. | 8/541 |
| 4,335,185 | 6/1982 | Adelman et al. | 8/115.6 |
| 4,369,213 | 1/1983 | Adelman et al. | 8/115.6 |

FOREIGN PATENT DOCUMENTS 54-77778  6/1979  Japan .

OTHER PUBLICATIONS

"Ultrablue Denims", Canadian Textile, p. 16, (Oct. 1982).

Primary Examiner—A. Lionel Clingman
Attorney, Agent, or Firm—Robert H. Falk; David M. Carter; Jeffrey S. Boone

[57] ABSTRACT

A new and useful indigo-dyeable polyester is disclosed, and process for making same, for which a suitable polyester has had applied to its surface an amount of a suitable indigo dye retaining compound effective to provide said polyester with indigo fastness properties similar to cotton. The new indigo dyeable polyester may be employed in the manufacture of a staple material blended with cotton in predetermined amounts depending on the end use desired, e.g., 50:50 by weight for cotton denims (e.g., jeans). Preferable indigo dye retaining compounds comprise monomers dioleylamine and dicocoamine. Other suitable indigo dye retaining monomers are disclosed, inter alia, having the formula:

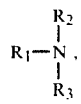

wherein $R_1$ is alkyl or alkenyl of about 10–18 carbons; $R_2$ is alkyl, alkylaryl, or alkenyl of about 8–18 carbons, $R-CH_2-NO_2$, $R-CH=NH$, where R is alkyl or alkenyl from one to eighteen carbons; and $R_3$ is hydrogen or alkyl from one to about twelve carbons. A process is also disclosed for treating a meltspun suitable polyester fiber with an amount (e.g., about 0.25%–2.0% by weight) of a suitable indigo dye retaining compound effective to provide said polyester fiber with indigo fastness properties similar to cotton.

2 Claims, 3 Drawing Figures

Polyester Staple Fiber Manufacturing Process Showing Points For Possible Addition (✻) of Indigo Dyeable Additive Polyester Filament Yarn Mannfacturing Process Showing Points For Possible Addition (✻) of Indigo Dyeable Additive

INDIGO-DYEABLE POLYESTER FIBERS AND PRETREATMENT OF POLYESTER TO PRODUCE SAME

BACKGROUND TO THE INVENTION

1. Field of the Invention

The instant invention relates to the field of man-made fibers and, in particular, to the manufacture of polyester fibers used in wear apparel. Further, the instant invention relates to the indigo-dyeing of polyester fiber. Specifically, the present invention relates to coated polyester fibers which are indigo-dyeable and possess washdown and crocking resistance similar to indigo-dyed cotton fibers, and to processes for preparing such fibers.

2. Description of the Prior Art, and Other Information

Indigo is a vat dye[1], known in India since the earliest periods for which historical records exist. Indigo has had for centuries such as aura of mystique that Sir Issac Newton included it as one of the colors of the spectrum. Dating back to early times, indigo has been used in dyeing of textiles and printing; cultivation of the indigo plant in India and other countries and its extraction, commercial manufacturing of indigo from anthraquinone, and indigo dyeing of cotton and wool have been the subject of much interest and reporting in the literature. See CIBA Review, No. 85 (April 1957); Trotman, DYEING AND CHEMICAL TECHNOLOGY OF TEXTILE FIBERS (Griffin Publ. Co., London, 4th edition, 1970) at 474–487; B. Kramrisch, "Dyeing and Printing With Indigo", AMERICAN DYESTUFF REPORTER at 34–38 (November 1980); THE THEORY OF COLORATION OF TEXTILES (C. L. Bird et al., editors, Dyers Co. Publications Trust London, 1975) at 43, 120; and THE APPLICATION OF VAT DYES (American Association of Textile Chemists & Colorists, 1953), AATCC Monograph No. 2 at 1–3 and 220–231.

[1]Vat dyes are insoluble in water and cannot be used for dyeing without modification. When treated with reducing agents, vat dyes are converted into leuco compounds—all of which are soluble in water in the presence of alkalis.

Indigo dye and its homologues are now used almost exclusively on cotton (cellulosics) in the production of denims. It has poor color fastness properties which are aesthetically appealing for this end-use and which fade in a predictable manner. It is applied by multiple padding of leuco indigo dye at ambient temperature followed by air oxidation after each padding.

Unfortunately, this method of application to polyester results in only staining of the polyester to a light color. Therefore, when polyester is used either in intimate blends or as filament yarns in combination with cotton for producing denim fabrics, the classic result is an undesirable contrast of the stained polyester with the deeply dyed cotton.

U.S. Pat. No. 4,335,185 and [its divisional] U.S. Pat. No. 4,369,213 to Adelman et al. of duPont de Nemours and Co. ("duPont"), Wilmington, Del., disclose a crosslinked polyvinyl alcohol polymer-coated polyester fiber wherein the underlying polyester fiber is dyed with a dye other than indigo dye in order to provide a base color for the fiber prior to application of the indigo dye containing polymer coating.

The literature has recently reported that duPont is offering for sale a solution-dyed Dacron polyester called "Ultrablue Dacron" designed to give the deep, rich coloration of traditional denims. This modified polyester is also said to give controlled fading during "wash-down" to a soft lighter blue coloration. CANADIAN TEXTILE at 16 (October 1982).

Defensive Publication T100,201 to Logullo (published Jan. 6, 1981) of duPont further discloses a polymeric salt coating having the following repeating units:

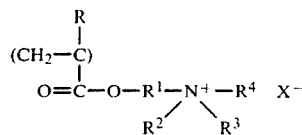

Problems of the classic prior art in indigo polyester dyeing are exemplified by the teaching of U.S. Pat. No. 3,527,556 to Riley, where artisans are taught to dye poly(glycol terephthalate) with natural or synthetic indigo at the boil, in an aqueous bath between about pH 4 and 6 in the presence of sodium ions and sodium hydrosulfite, to transform the indigo into the yellow sodium leuco form, followed by oxidizing the indigo to its blue form; in other words, to dye polyester with indigo dye in a similar manner as with other vat dyes. We have found this type of process to be unsatisfactory insofar as the indigo-dyed polyester does not simulate the fastness properties of indigo-dyed cotton, e.g., denim.

U.S. Pat. No. 3,504,998 to Speier discloses a process for coloring non-siliceous textile fibers, e.g., acrylics, polyesters and saran, with:

(1) an aqueous solution of an organo-silicon compound selected from the group consisting of (A) water soluble reaction products of water and a polyaminoalkylsilane of the formula:

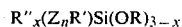

where x is an integer from 0 to 1 inclusive, each R is an alkyl radical of less than 4 carbon atoms; R' is an aliphatic hydrocarbon radical containing a number of carbon atoms selected from the group consisting of 1 and more than 2 carbon atoms and having a valence of n+1 where n is an integer of at least 1; Z is a monovalent radical attached to R' by a carbon-nitrogen bond and is composed of carbon, nitrogen, and hydrogen atoms, and further contains at least two amine groups, the ratio of carbon atoms to nitrogen atoms in the substituent —R'Zn being less than 6:1; and R" is a monovalent hydrocarbon radical free of aliphatic unsaturation; and (B) water soluble acid salts of (A); and (2) a textile dye stuff.

U.S. Pat. No. 3,793,341 to Genta and U.S. Pat. Nos. 3,960,479 and 4,032,539, each to Tsujimoto et al., are illustrative of the prior art in that novel synthetic indigoid compounds are claimed which are alleged to be more active in dyeing with polyester fibers than the natural indigo dye counterparts. However, it can be fairly said in the fastness properties of the resulting dyed polyester, the public has been unsatisfied with the results vis-a-vis cotton, e.g., denim.

Of lesser interest are U.S. Pat. Nos. 4,370,144; 4,131,422; 3,766,115; 4,197,087; 1,889,154; 3,891,386; 3,764,264; 4,063,887; 3,135,577; 3,837,798; 4,263,009; 4,153,413; 4,207,069; 4,166,717; 4,118,183; 3,773,463; 2,663,612; 3,872,183; 4,249,902; and 4,155,710. See Howard L. Needles et al., "Effect of Nonionic Surfactant in Heat on Selected Properties of Polyester", J. APP. POLYMER SCIENCE 25 at 1737-1744 (1980).

SUMMARY OF THE INVENTION

I have made a new and useful indigo dyeable polyester, comprising a suitable polyester fiber which has had applied to its surface an amount of a suitable indigo dye compound effective to provide said polyester fiber with indigo fastness properties similar to cotton, which very satisfactorily overcomes the classic problems of commercially available polyester fibers which have resisted indigo-dyeing. It is believed that this result represents a truly dramatic advance in the polyester-dyeing art, inasmuch as it is the first practical indigo dyeable polyester, i.e., with a process permitting the first indigo dyeing of polyester in the same manner as indigo dyeing of cotton, e.g., denim.

By the term "indigo fastness properties similar to cotton", it is meant the ability of a suitable polyester undergoing washing pursuant to Test IIA of the AATCC Test Method 61-1980, "Colorfastness to Washing, Domestic; and Laundering, Commercial-Accelerated", AATCC TECHNICAL MANUAL at 179-181 (1980), incorporated herein, to retain indigo dye, on a percentage basis relative to cotton washed to the same degree, of at least about 25% at all times from initial dyeing through five washes, comparable to 25 home washes. Note FIG. 1.

A preferable application of my indigo dyeable [modified] polyester fiber is a staple fiber blended with cotton, most preferably where the weight ratio in the blend of polyester fiber to cotton is about 50:50. The modified indigo-dyeable polyester fiber in one embodiment may be a continuous filament yarn, preferably where the yarn is flat, or, in the alternative, may be textured.

The suitable indigo dye compound may comprise one or more suitable indigo-dye retaining monomers. A suitable indigo-dye retaining monomer:

(a) is capable to be applied in any stage after extrusion but before dyeing;

(b) provides an active site for the indigo dye;

(c) must be capable of attaching/affiliating itself to an effective/sufficient degree so that after dyeing, the [modified] dyed polyester has the fastness properties similar to cotton, supra;

(d) must be soluble in or emulsifiable in a solvent used in a spin finish/finish bath or equivalent step; and (e) is substantially non-reactive (other than hydrogen bonding) with polyester at temperatures below about 220° C.

In the broadest concept of my invention, a suitable indigo dye retaining compound may comprise suitable monomers of any secondary, tertiary, or quaternary cationic amine capable when applied in an effective amount to impart indigo fastness properties similar to cotton.

Specifically, in one embodiment, I have found (see the Examples, infra, and in particular Example VI) that the suitable indigo dye retaining compound may comprise monomers, each monomer having the formula:

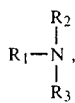

wherein $R_1$ is alkyl or alkenyl of about ten to about eighteen carbons; $R_2$ is alkyl, alkylaryl, alkenyl of about eight to eighteen carbons, $R-CH_2-NO_2$, or $R-CH=NH$, where R is alkyl or alkenyl of from one to eighteen carbons; and $R_3$ is hydrogen or alkyl from one to about twelve carbons. Preferably, $R_1$ and $R_2$ are the same entity; in the alternative, $R_1$ and $R_2$ are n-$C_{12}H_{25}$ and $R_3$ is hydrogen.

In a preferred embodiment (see Example III), each of $R_1$ and $R_2$ of the suitable indigo-retaining compound comprises monomers where $R_1$ and $R_2$ are coco ("coco" in the trade means n-$C_{12}H_{25}$; note also Table 6, infra.) and $R_3$ is H or alkyl of one to twelve carbons. In fact, a very preferred species of my invention utilizes the dicocoamine (predominately di-"coco" amine, or $R_1=R_2=$n-$C_{12}H_{25}$; $R_3=$H) sold under the brandname ARMEEN 2C ™ (available from the Armak Company, Chicago, Ill.). $R_3$ may preferably be also n-$C_4H_9$, $C_{12}H_{25}$, or n-$C_3H_6NH_2$, i.e., $C_2H_4CH_2NH_2$.

In still another preferred embodiment (see Examples I-II), I have found that the suitable indigo-retaining compound comprises monomers wherein each of $R_1$ and $R_2$ are oleyl, and $R_3$ is H, or alkyl of one to eight carbons. Of these monomers, dioleylamine is most preferred. I have used a dioleylamine sold under the brandname ARMEEN 2-0 ™ (also available from Armak Company, Chicago, Ill).

In yet another preferred embodiment having the above formula, where $R_1$ can be coco, $R_3$ is hydrogen, and $R_2$ selected from the group consisting of iso-$C_8H_{17}$ and $CH_2(CH_3)_2CNO_2$.

In still another embodiment having the above formula, I have found that each of $R_1$ and $R_2$ may be tallow, and $R_3$ is H, or alkyl of one to eight carbons. In a preferred embodiment, $R_3$ is selected from the group consisting of H or $CH_3$, n-$C_4H_9$, or $C_3H_6NH_2$.

I have found suitable indigo dye retaining compounds may comprise monomers of the above pertinent formulas; specifically, the compounds may comprise, inter alia, one or more of the following species (see Example VI) by chemical trade name in addition to the two preferred species mentioned above, dicocoamine and dioleylamine):

(1) N-N dibenzylmethylamine[1],
(2) ditetradecylamine[1],
(3) methylditetradecylamine[3],
(4) dihexadecylamine (available under the mark ARMEEN 2-16 ™ )[2],
(5) methyldihexadecylamine (ARMEEN M2-16 ™ )[2],
(6) methyldioctadecylamine (ARMEEN M2-18 ™ )[2],
(7) ditallowalkylamine,
(8) methylditallowalkylamine[3],
(9) di(hydrogenatedtallow)amine[3],
(10) n-butyldioctadecylamine[3],
(11) ditallowaminopropane (DUOMEEN 2T ™ also available from Armak Co.),
(12) iso-octyltallowamine (ARMEEN TL8 ™ )[2],
(13) methyliso-octyltallowamine[3],
(14) didodecylamine (ARMEEN 2-12 ™ )[2],
(15) methyldidodecylamine (ARMEEN M2-12 ™ )[2],
(16) methyldicocoamine (ARMEEN M2C ™ )[2],
(17) n-butyldidodecylamine[3],
(18) iso-octylcocoamine (ARMEEN CL8 ™ )[2],
(19) tridodecylamine[3],
(20) dodecylnitrobutylamine[3],
(21) didodecylaminopropane (DUOMEEN 2C ™, also available from Armak Co.),

[1] Available from Aldrich Chemical Company, Milwaukee, Wis.
[2] Available from the Armak Co., Chicago, Ill.
[3] Obtained from the Armak Co.

As mentioned previously, I have found that the suitable indigo dye retaining compound may comprise any quaternary cationic amines capable when applied in effective amounts to impart indigo fastness properties similar to cotton. Specifically, and not by way of limitation, I have found operative a compound comprising monomers, each monomer having the formula:

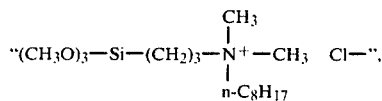

note Example 4, which uses various formulas of this monomer, 3(trimethoxysilyl)propyloctadecyldimethyl ammonium chloride. It is known that this monomer at least forms in the spin finishing step or thereafterwards a polymer to coat a polymer. However, whether or not a given suitable monomer forms a polymer will depend on the nature of the monomer and finish conditions.

In the manufacture of the [modified] indigo-dyeable polyester fiber, I have found generally that the suitable indigo dye retaining compound is from about 0.25% by weight to about 2% of my finished [modified] indigo-dyeable polymer fiber, in many circumstances [preferably] about 0.25% to about 1.0% of the [modified] polymer fiber, and in some circumstances is [preferably] only about 0.25% to about 0.5% of the polymer fiber. For example, where the suitable indigo dye retaining compound is dioleylamine, it may comprise only about 0.25% by weight of the [modified] indigo-dyeable polyester.

In most applications, the suitable indigo dye monomer will make up about 8% to about 50% of the spin finish or other applicable solution to which the suitable polyester is subjected; preferably, it is in the range of about 8% to about 15%. Of course, these concentrations are a function of the desired parameters of the finished [modified] polyester, the suitable monomer, step conditions (e.g., temperature), spin finish solvent composition, and the like. Some reasonable experimentation will be needed by the artisan to perfect spin finish concentration and conditions, depending on design parameters.

The process for making my indigo-dyeable polyester fiber comprises the step of treating a meltspun suitable polyester fiber with an amount of a suitable indigo-dye retaining compound effective to provide said polyester fiber with indigo fastness properties similar to cotton, (1) for staple fiber preferably in the spin finish or finish bath (see FIG. 2) and (2) for filament yarn preferably in the spin finish or after oil treatment steps. The spin finishing step may occur at ambient temperature, and generally the suitable indigo dye retaining compound is present in an effective amount in the spin finishing or finish bath solution sufficient to be aout 0.25% to about 2.0% by weight of the finished modified polyester fiber.

The terms "suitable polyester", "suitable polyester fiber", "polyester", and the like as used herein refer to both homo- and co-polyesters known by those in the art and to future equivalent polyesters. Examples of said polyesters are those which can be obtained by reacting one or more of the following listed acids or their ester-forming derivatives with one or more bivalent or multivalent aliphatic, alicyclic, aromatic or araliphatic alcohols or a bisphenol. Typical acids are adipic acid, pimelic acid, suberic acid, azelaic acid, sebacic acid, nonane dicarboxylic acid, decane dicarboxylic acid, undecane dicarboxylic acid, terephthalic acid, isophthalic acid, alkyl-substituted or halogenated terephthalic acid, alkyl-substituted or halogenated isophthalic acid, nitroterephthalic acid, 4,4'-diphenyl ether dicarboxylic acid, 4,4'-diphenyl thioether dicarboxylic acid, 4,4'-diphenyl sulfone-dicarboxylic acid, 4,4'-diphenyl alkylenedicarboxylic acid, naphthalene-2,6-dicarboxylic acid, cyclohexane-1,4-dicarboxylic acid and cyclohexane-1,3-dicarboxylic acid. Typical diols or phenols suitable for the preparation of these homo- and co-polyesters are: ethylene glycol, diethylene glycol, 1,3-propanediol, 1,4-butanediol, 1,6-hexanediol, 1,8-octanediol, 1,10-decanediol, 1,2-propanediol, 2,2-dimethyl-1,3-propanediol, 2,2,4-trimethylhexanediol, p-xylenediol, 1,4-cyclohexanediol, 1,4-cyclohexane dimethanol, and bix-phenol A. Preferred are polyesters and copolyesters or terephthalate acid, especially polyethylene terephthalate (PET). The structure of PET is shown as follows:

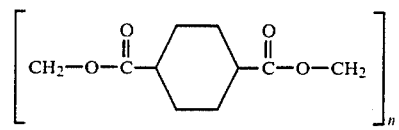

Also applicable to the instant invention as an equivalent to "polyester" are the family of polybutylene terephthalates [PBT]. The formula for the most basic PBT is, as the artisan will recognize:

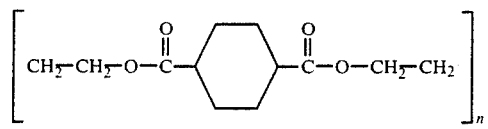

For purposes of my invention, the term "suitable polyester" will include the family of polybutylene terephthalates, and all other known similar polymers and their future equivalent polymers of the formula:

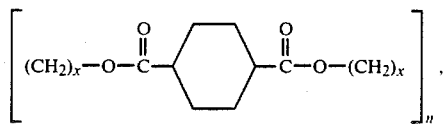

where x is any integer greater than 2.

DETAILED DESCRIPTION OF THE PREFERRED EMBODIMENTS

Figure 1:
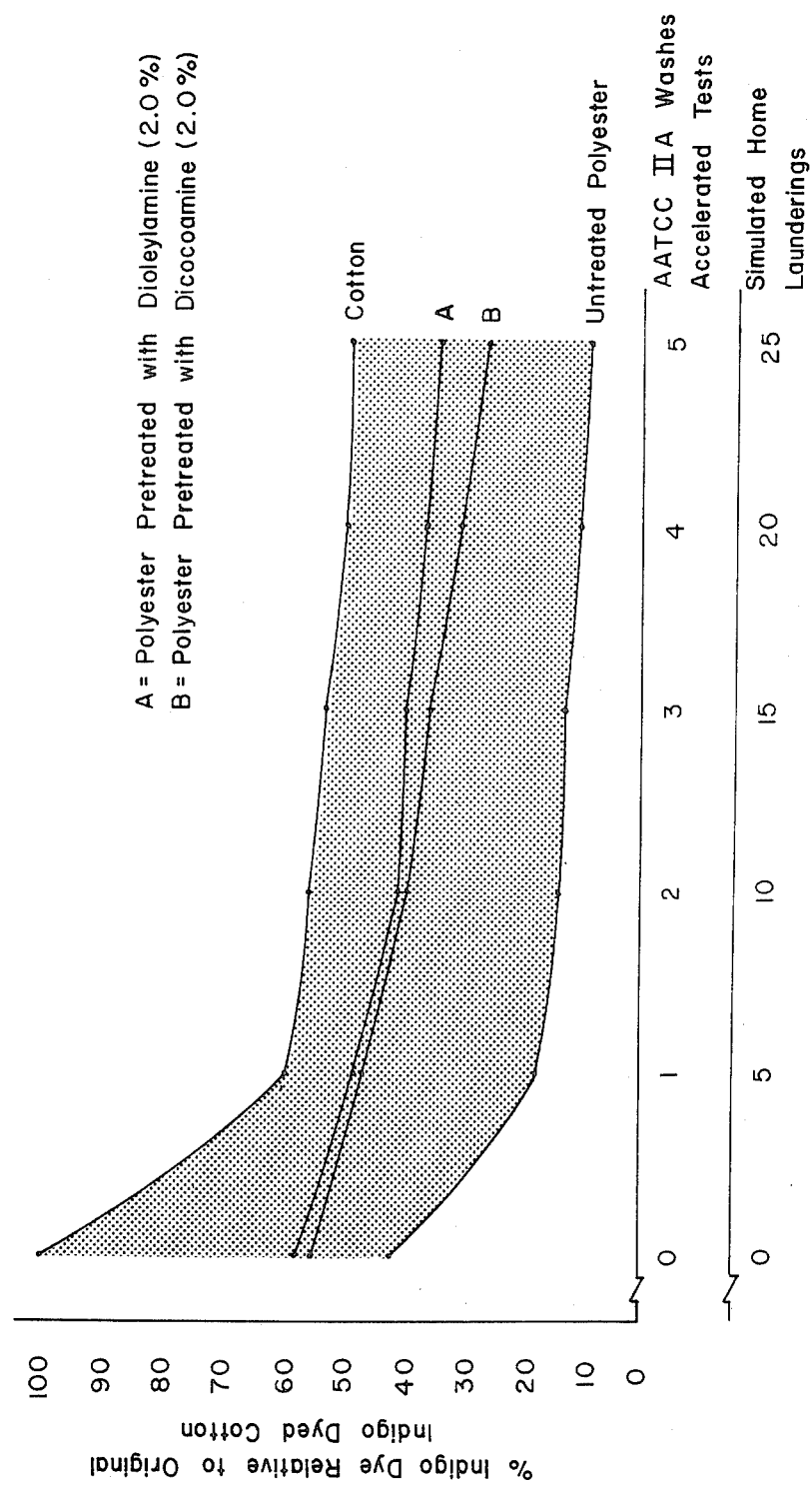
FIG. 1 is a graph depicting the wash fastness of indigo dye on polyester pretreated with two very preferred suitable indigo dye compounds comprising monomers of dioleylamine (2% by weight of finished polyester) and dicocoamine (2% by weight of finished polyester), using Test IIA of the AATCC Test Method 61-1980, "Colorfastness to Washing Domestic; and Laundering; Commercial Accelerated", AATCC TECHNICAL MANUAL at 179–181 (1980), and comparing same against cotton and untreated polyester. One AATCC IIA wash simulates five home launderings, also depicted.

1. Theory of Attachment of Indigo Dyeing Compounds to Polyester and of Indigo Dyeing The structure of polyethylene terephthalate (polyester) is shown as follows:

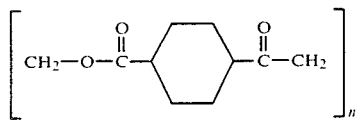

Dioleylamine, one of the best candidates to impart indigo dyeable properties to polyethylene terephthalate, is shown below:

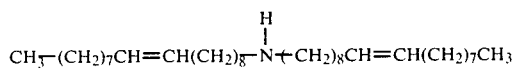

While not limited to the following theory, it is believed that these amine compounds attach themselves to the polyethylene terephthalate surface by means of hydrogen bonding (and the resulting dipole-dipole interaction), van der Waal's forces and interaction between the double bonds of the two systems, forming $\pi$ bonds as a result of pairing of electrons.

The indigo dye structure is as follows:

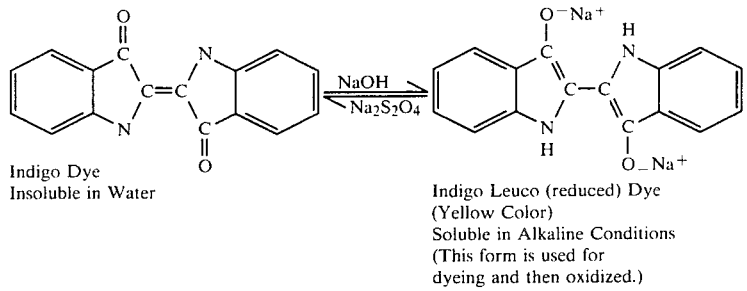

Indigo Dye
Insoluble in Water

Indigo Leuco (reduced) Dye
(Yellow Color)
Soluble in Alkaline Conditions
(This form is used for dyeing and then oxidized.)

The leuco indigo dye and the reoxidized indigo dye both have the capabilities for hydrogen bonding, van der Waal's forces and interaction between the double bonds of the systems, all of which result in a satisfactory degree of permanence of the indigo dye to simulate somewhat the poor but aesthetically desirable properties of indigo dye on cotton denim.

2. Addition of Indigo Dyeing Compound During Fiber And/Or Yarn Manufacture

The indigo dyeable additive, i.e., the suitable indigo-dye retaining monomer(s), can be added to the suitable polyester at any stage of yarn and/or fabric manufacture after spinning and before dyeing.

In the manufacture of filament yarn and staple fiber polyester, it is desirable to add the indigo dyeable additive prior to selling the yarn and/or fiber to a customer who intends to either use 100% polyester or blends with polyester/cotton and/or blends with polyester/other fiber for indigo dyeing.

As one skilled in the art will appreciate, depending on whether filament yarn or staple fiber is being manufactured, the point of application of the indigo dyeable additive in the manufacturing process could be different.

In the spinning of both filament yarn and staple fiber, a spin finish is added to the yarn, usually within a distance of 1 to 2 meters after the filaments are extruded from the spinnerette. The indigo dyeable additive can be added at this point (generaly room temperature, i.e., 20°-25° C.). We at the American Enka Company, Enka, N.C. (a division of Akzona Incorporated, Asheville, N.C.) prefer to add the suitable compound so that in the finished yarn, it is in the range of from about 0.25% to about 2%, although these boundaries are approximate and larger or smaller amounts may be employed. For flat (untextured) filament yarns, the spin finish point of application is preferred.

Sometimes, yarns are spun and wound on take-up packages as undrawn (UOY), partially oriented (POY) or fully oriented (FOY) yarns. The indigo dyeable additive may be applied to all of these yarns, along with the spin finish at room temperature again so that the monomers are from about 0.25% to about 2% of the finished yarns, and these yarns may be subsequently processed into drawn flat yarns, drawn and textured yarns or drawtextured yarns by any normal drawing and/or texturing or drawtexturing processes known to those skilled in the art.

The spin finishing or other operative step where the suitable indigo-dye retaining compound is applied to the polyester may take place not only at room temperature but at temperatures up to the boiling point of the compound or solvent; in fact, mild elevated temperatures above room temperature would facilitate such application, and are to be avoided only because of factors not associated with this invention. It will be appreciated by the artisan that the meltspun polyester subjected to the spin finish is itself at an elevated temperature which acts to facilitate application of the compound. The spin finish (or other) solvent must be inert to the suitable indigo-dye retaining compound, and it has been found that aqueous bases for spin finish (and other) solvents are operable. In general, the suitable indigo-dye retaining compound is added in its monomer form either in solution or as solid particles in an emulsion, in a sufficient amount to apply about 0.25% to about 2% to the finished polyester, at any temperature up to the boiling point of the solvent or monomer, whichever is lower. The artisan will appreciate that in many embodiments of the invention, the finish bath will comprise emulsified solids, e.g., dioleylamine melts at about 35° C. and the bath is utilized at room temperature.

Those yarns that are textured usually have an afteroil (e.g., LUROL ™ [types 200, 75, 71, 55A], George A. Goulston Company, Monroe, N.C.); STANTEX ™ [types 5193, 581, ST5, ST8], Standard Chemical Division of the Henkel Co., Charlotte, N.C.) applied to them after texturing and before winding onto a package. The indigo dyeable additive may also be applied in conjunction with the afteroil to the textured yarns.

In the staple fiber manufacturing process, a very large number of continuous filament yarns are collected after spinning to form a large tow (as much as 1,000,000 denier). A sheet of these yarns is formed from the tow and passed through a finish bath at about 70°–75° C. The indigo dyeable additive may be added to yarn along with the finish in this bath. The sheet of yarns is then drawn and further processed into staple fiber.

Figure 2:
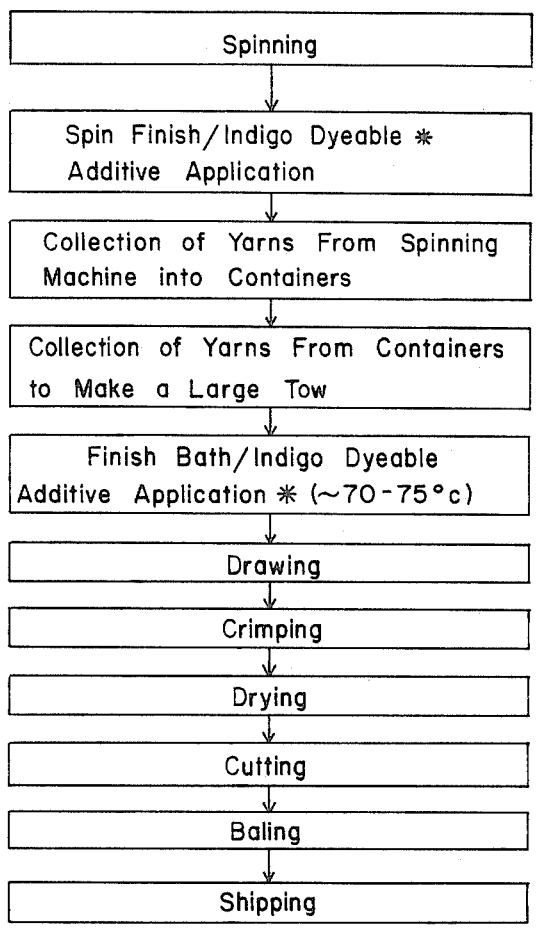
FIG. 2 is a flow diagram for a polyester staple manufacture embodiment showing points [steps] for possible addition of indigo dyeable additive.
Figure 3:
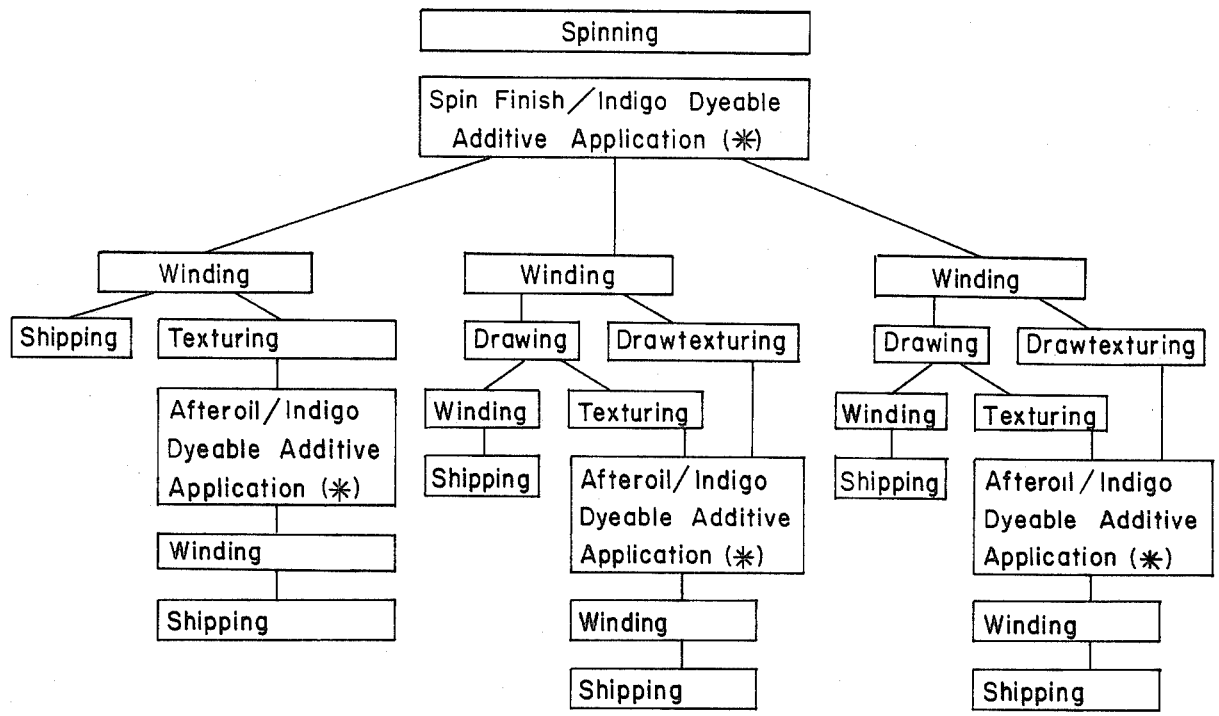
FIG. 3 is a flow diagram for a polyester filament yarn manufacture embodiment showing points for possible addition of indigo dyeable additive.

FIGS. 2 and 3 show possible points for addition of the indigo dyeable compounds during fiber and/or continuous filament yarn manufacturing of polyester.

Although my invention has been described above in terms of selected preferred embodiments, it should not be limited thereto, since other equivalent embodiments and modifications and improvements thereto will readily occur to one skilled in the art. It is, therefore, understood that the appended claims following the Examples cover all such equivalent embodiments and modifications and improvements as fall within the spirit and scope of the invention.

EXAMPLE 1

Samples of 320/96 polyester textured yarn which had been knitted into tubes and scoured for 20 minutes at 88° C. with 0.5 grams per liter of TANAPON X-70 TM (Sybron Co., Chemical Division, Wellford, S.C.), a modified polyglycol ether emulsifier, and 0.5 grams per liter of sodium carbonate and rinsed were padded through isopropyl alcohol solutions of 0%, 0.25%, 0.50%, 1.0%, and 2.0% of di-cis-9-octadecaenoic amine. The isopropyl alcohol solutions were heated to 35° C. prior to padding to ensure total solubility of the di-cis-9-octadecanenoic amine (i.e., dioleylamine), obtained from the Armak Company of Chicago, Ill., under the mark ARMEEN 2-0 TM, with the isopropyl alcohol. The padder roll pressures were adjusted to give 100%±5% wet pick-up. This yielded approximately 0%, 0.25%, 0.50%, 1.0% and 2.0% of the di-cis-9-octadecaenoic amine (i.e., dioleylamine) on the weight of the knitted polyester tubes. The tubes were subsequently dried on aluminum forms in a hot air circulating oven for 5 minutes at 120° C. after which they were indigo dyed by the following method. Also, a scoured cotton knitted tube of 26/1 cotton yarn was dyed as a control along with these polyester tubes.

Three liters of the indigo dyebath were prepared in a stainless steel beaker by dissolving 15.0 grams per liter of 50% sodium hydroxide into 2800 ml. of water at 80° F. (27° C.), stirring in 6.0 grams per liter of indigo dye (Indigo Pure BASF Powder K from BASF, Ludwigshafen, West Germany; obtained from its U.S. affiliate located in Charlotte, N.C.) powder and 10.0 grams per liter of sodium hydrosulfite. This mixture was then brought up to 3 liters volume and stirred for 10 to 15 minutes, and then covered to exclude air and allowed to stand overnight at room temperature to fully reduce the indigo dye. Additional sodium hydrosulfite as needed to clear the indigo dye and 1.0 gram per liter of TRITON X-100 TM nonionic surfactant, made by the Rohm & Haas Co., Philadelphia, Pa., to reduce the dyebath surface tension and to allow good wetting of the polyester was added just prior to dyeing.

Each knitted tube was dyed in a fresh aliquot of the reduced indigo dyebath as follows: 500 ml of the reduced indigo dye was placed in the laboratory padder trough. The padder squeeze roll pressures necessary to give 100%±5% wet pick-up had previously been determined using scoured 320/96 polyester and 26/1 cotton tubes. Each knitted tube was padded through the reduced indigo dyebath and squeezed to 100%±5% wet pick-up. The padded tube was then skyed (air oxidized) for 60 seconds. This alternative padding and skying was repeated for a total of 6 paddings and 6 skyings for each tube. Each tube was then rinsed under a running faucet at 120° F. (49° C.) for 10 minutes and then centrifugally extracted and air dried.

After air drying the L* reflectance of the indigo dyed tubes were measured with a Hunter Color Difference Meter (Hunter Lab Colorimeter, Model D25M-3, Hunter Associates Lab, Inc., Fairfax, Va.) and the K/S value (which is the ratio of the light absorption coefficient, K, to that of the scattering coefficient, S), was calculated for each dyed tube by the following equation:

$$K/S = \frac{\left[1 - \left(\frac{L^* + 16}{116.03972}\right)^3\right]^2}{2\left(\frac{L^* + 16}{116.03972}\right)^3}$$

The K/S values are approximately proportional to the dye contents of the indigo dyed tubes and correlate well with the visual appearance of the tubes. These K/S values are shown in Table 1.

Samples from each indigo dyed tube were tested for washfastness by the aforementioned AATCC Wash Test Method 61-1980, "Colorfastness to Washing, Domestic; and Laundering, Commercial—Accelerated", Test IIA, at 120° F. (49° C.). Each sample was washed 1, 2 and 5 times. The Hunter L* values were determined and K/S values calculated. These K/S values are shown in table 1. Each AATCC IIA accelerated wash test simulates the color loss of 5 home launderings; therefore, 1, 2, and 5 AATCC accelerated washes simulates the color loss of 5, 10 and 25 home launderings, respectively. The percent color loss from the original dyeings of each sample and from each preceding wash and the percent dye relative to that of cotton after each wash was calculated from the K/S values and is shown in Table 1.

Crockfastness tests employing AATCC Test Method 116-1977, Crocking: Rotary Vertical Crock Meter Method (AATCC TECHNICAL MANUAL at 139–140 (1977)) and dye lightfastness (AATCC Test Method 16E) 981, AATCC TECHNICAL MANUAL at 160–162 (1981)) tests by exposure in the Xenon Arc Weather-Ometer (Xenon Arc Weather-Ometer, Model 65/DMC-R, by Atlas Electric Devices Co., Chicago, Ill.) for periods of 10, 20 and 40 standard fading hours were performed. These results are given in Table 1.

TABLE 1

INDIGO DYE RESULTS AND DYE FASTNESS TESTS ON POLYESTER KNITTED TUBES AND CONTROLS TREATED WITH DI-CIS-9-OCTADECAENOIC AMINE

| | KNITTED TUBES | | | | | |
|---|---|---|---|---|---|---|
| | COTTON | PET | PET | PET | PET | PET |
| % di-cis-9-octadecaenoic amine (i.e., dioleylamine) | 0 | 0 | 0.25 | 0.50 | 1.0 | 2.0 |
| Original Dyeings | | | | | | |
| K/S Value | 21.42 | 5.23 | 10.24 | 11.33 | 13.40 | 13.27 |
| % Dye Relative to Cotton | — | 24.4 | 47.8 | 52.9 | 62.6 | 61.9 |
| Washed 1 Time (AATCC IIA) | | | | | | |
| K/S Value | 14.41 | 2.65 | 7.40 | 7.26 | 8.94 | 11.86 |
| % Dye Loss From Original Dyeing | 32.7 | 49.3 | 27.7 | 35.9 | 33.3 | 10.6 |
| % Dye Relative to Cotton Washed 1 Time | — | 18.4 | 51.4 | 50.4 | 62.0 | 82.3 |
| Washed 2 Times (AATCC IIA) | | | | | | |
| K/S Value | 13.62 | 1.99 | 5.66 | 6.02 | 6.91 | 10.96 |
| % Dye Loss From Original Dyeing | 36.4 | 62.0 | 44.7 | 46.9 | 48.4 | 17.4 |
| % Dye Loss From 1st Wash | 5.5 | 24.9 | 23.5 | 17.1 | 22.7 | 7.6 |
| % Dye Relative to Cotton Washed 2 Times | — | 14.6 | 41.6 | 44.2 | 50.7 | 80.5 |
| Washed 5 Times (AATCC IIA) | | | | | | |
| K/S Value | 8.71 | 1.89 | 3.73 | 4.41 | 6.21 | 7.55 |
| % Dye Loss From Original Dyeing | 59.3 | 63.9 | 61.1 | 53.7 | 43.1 | |
| % Dye Loss From 1st Wash | 39.6 | 28.7 | 49.6 | 39.3 | 30.5 | 36.3 |
| % Dye Loss From 2nd Wash | 36.1 | 5.0 | 34.1 | 26.7 | 10.1 | 31.1 |
| % Dye Relative to Cotton Washed 5 Times | — | 21.7 | 42.8 | 50.6 | 71.3 | 86.7 |
| AATCC Crockfastness Test 116-1977 | | | | | | |
| Dry | 4 | 2–3 | 3 | 2–3 | 2 | 1 |
| Wet | 2–3 | 2 | 4 | 4–5 | 4–5 | 4–5 |
| Dye Lightfastness AATCC 16E-1981 - Exposure in Xenon and Weather-Ometer | | | | | | |
| 10 Hrs. | 5 | 4–5 | 5 | 5 | 5 | 5 |
| 20 Hrs. | 5 | 4–5 | 5 | 5 | 5 | 5 |
| 40 Hrs. | 5 | 2–3 | 3 | 3–4 | 3–4 | 3–4 |

N.B.: The numbers assigned to the crockfastness and lightfastness test ratings were determined by comparing the fastness tests to the AATCC Gray Scale ("Gray Scale for Color Change", AATCC Evaluation Procedure 1", AATCC TECHNICAL MANUAL 57 at 111-112 (1981/1982) for assessing color change. The numbers signify: 5 = excellent; 4 = good; 3 = fair; 2 = poor; 1 = very poor

EXAMPLE 2

Dioleylamine applied to PET through spin finishing. 265/32 POY polyester yarns were spun at 2800 meters per minute on a pilot plant spinning machine. In one case, a spin finish composition consisting of 50% di-cis-9-octadecaenoic amine was metered onto the yarn via a metered finish applicator at a level of 1% add-on onto the yarn. In a second case, a different spin finish formation but again consisting of 50% di-cis-9-octadecaneoic amine was used at a 1% add-on level to the yarn. In still a third case, a spin finish known internally as PEF-38 which did not contain any di-cis-9-octadecaenoic amine was applied to the yarn at a 1% add-on level.

These yarns were subsequently drawtextured, knitted into tubes and indigo dyed along with a cotton control in the same manner as Example 1.

Hunter L* values were determined with the aforementioned Hunter Color Difference Meter and washfastness, crockfastness and lightfastness tests were performed as in example 1. These results are summarized in Table 2.

TABLE 2

INDIGO DYE AND DYE FASTNESS TEST RESULTS ON POLYESTER YARNS SPUN WITH DI-CIS-9-OCTADECAENOIC AMINE IN SPIN FINISH

| | PET POY Yarns Spin Finish Formulations | | | |
|---|---|---|---|---|
| | Cotton Control | PEF-38 | Formulation 1 | Formulation 2 |
| % di-cis-9-octadecaenoic amine | 0 | 0 | 1% | 1% |
| K/S Value | 20.71 | 8.21 | 9.36 | 9.49 |
| % Dye Relative to Cotton | — | 39.6 | 45.2 | 45.8 |
| AATCC IIA Wast Test Color Change | 3 | 1–2 | 2–3 | 2–3 |
| AATCC 116-1977: | | | | |
| Dry | 2–3 | 2 | 2 | 2 |
| Wet | 2 | 2 | 2 | 3–4 |
| Dye Lightfastness (AATCC 16E-1981)- Exposure in Xenon Air Weather-Ometer | | | | |
| 10 Hrs. | 5 | 4–5 | 5 | 5 |
| 20 Hrs. | 5 | 4–5 | 4 | 4 |
| 40 Hrs. | 5 | 3 | 3 | 3 |

N.B.: The numbers assigned to the fastness test ratings were obtained by comparison of the fastness tests with the AATCC Gray Scale, supra, for assessing color change. The numbers signify: 5 = excellent; 4 = good; 3 = fair; 2 = poor; 132 very poor.

EXAMPLE 3

Dicocoamine applied through spin finishing. Polyester yarn was spun on a pilot plant spinning machine at 1250 meters per minute spinning speed through a 48 hole spinnerette with a dicocoamine incorporated into the spin finish. The spin finish was metered onto the yarn to give a 1% add-on level of the dicocoamine onto the yarn. A second yarn was spun using the same spin finish but without the dicocoamine. These yarns were subsequently drawn to a 3.95 draw ratio to give a 150 denier 48 filament fully drawn flat yarn.

Knitted tubes were made from these yarns and they were indigo dyed along with a cotton control as in Example 1.

Hunter L* values were determined and washfastness, crockfastness and lightfastness tests were performed as in Example 1. These results are summarized in Table 3.

on the weight of the finished (modified) polyester knitted tubes of di-cis-9-octadecaenoic amine and of dicocoamine. Also, water emulsions of di-cis-9-octadecaneoic amine with PEG 600 monolaurate were prepared and samples of the scoured polyester tubes were padded to give 0.25%, 0.50%, 1.0% and 2.0% of the di-cis-9-octadecaenoic amine on the weight of the

TABLE 3

|  | K/S Value | % Dye Relative to Cotton | AATCC IIA* Wast Test % Color Loss | AATCC 116-1977 Crockfastness | | Lightfastness AATCC 16E-1981 Hours Expoure in Xenon Air Weather-Ometer | | |
|---|---|---|---|---|---|---|---|---|
|  |  |  |  | Dry | Wet | 10 | 20 | 40 |
| Cotton Control | 18.70 | — | 50% | 2 | 2 | 5 | 4–5 | 4 |
| PET | 5.61 | 30.0 | 90% | 2 | 2 | 3–4 | 3 | 2 |
| PET with 1% dicocoamine | 9.26 | 49.5 | 20% | 2 | 4 | 5 | 4–5 | 2 |

Note:
The crockfastness and lightfastness test ratings were obtained by comparison of the fastness tests with the AATCC Gray Scale, supra, for assessing color change. The numbers signify: 5 = excellent; 4 = good; 3 = fair; 2 = poor; 1 = very poor.
*This column comprises only a visual observation of color loss.

EXAMPLE 4

Knitted tubes of 320/96 polyester were scoured as in Example 1 and padded through isopropyl alcohol solutions of 0, 0.25, 0.50, 1.0 and 2.0% active 3(trimethoxysilyl)propyloctadecyldimethyl ammonium chloride, Dow Corning's 5700 TM antimicrobial agent. As in Example 1, these knitted tubes were padded to 100%±5% wet pick-up which yielded 0, 0.25, 0.50, 1.0 and 2.0% add-on of the Dow Corning 5700 TM product. These padded tubes were dried on aluminum forms in a hot air circulating oven and then indigo dyed as in example 1.

Hunter L* values were determined and washfastness, crockfastness and lightfastness were performed as in Example 1. These results are summarized in Table 4.

finished polyester knitted tubes. One water emulsion of the di-cis-9-octadecaenoic amine was prepared with Pluronic P94 TM (BASF Wyandotte, Mich.) and a scoured polyester tube was padded to give 2.0% of the di-cis-9-octadecaenoic amine on the weight of the finished polyester knitted tube.

These tubes were dried on aluminum forms at 120° C. in a hot air circulating oven and indigo dyed, rinsed, centrifugally extracted and air dried in the same manner as in Example 1.

After air drying, 5 wash test samples were prepared from each tube. These wash test samples were washed 1, 2, 3, 4 and 5 times, as in Example 1, after which they were air dried and the reflectance values of the original dyeing and of samples washed 1, 2, 3, 4 and 5 times by AATCC Wash Test Method 61-1980 as in Example 1

TABLE 4

INDIGO DYE RESULTS AND DYE FASTNESS TESTS ON POLYESTER KNITTED TUBES AND CONTROLS TREATED WITH DOW CORNING 5700 TM PRODUT

|  | COTTON | PET | PET | PET | PET | PET |
|---|---|---|---|---|---|---|
| % Dow Corning 5700 TM | 0 | 0 | .25 | .50 | 1.0 | 2.0 |
| Original Dyeings |  |  |  |  |  |  |
| K/S Value | 22.63 | 6.79 | 15.29 | 17.92 | 20.07 | 20.93 |
| % Dye Relative to Cotton | — | 30.0 | 67.6 | 79.2 | 88.7 | 92.5 |
| Washed 1 Time (AATCC IIA) |  |  |  |  |  |  |
| Visual Estimate of % Color Loss | 50% | 70% | 60% | 60% | 60% | 60% |
| Washed 2 Times (AATCC IIA) |  |  |  |  |  |  |
| Visual Estimate of % Color Loss | 60% | 80% | 60% | 60% | 60% | 60% |
| Washed 5 Times (AATCC IIA) |  |  |  |  |  |  |
| Visual Estimate of % Color Loss | 70% | 90% | 70% | — | — | 60% |
| AATCC Crockfastness Test 116-1977 |  |  |  |  |  |  |
| Dry | 2 | 2 | 1–2 | 1–2 | 1–2 | 1–2 |
| Wet | 1 | 1 | 1 | 1 | 1 | 1 |
| Dye Lightfastness AATCC 16E-1981 - Exposure in Xenon Air Weather-Ometer |  |  |  |  |  |  |
| 10 Hrs. | 5 | 4–5 | 5 | 5 | 5 | 5 |
| 20 Hrs. | 4–5 | 3–4 | 4–5 | 5 | 5 | 5 |
| 40 Hrs. | 4–5 | 2–3 | 3–4 | 4 | 4–5 | 4–5 |

NOTE:
The numbers assigned to the crockfastness and lightfastness test ratings were determined by comparing the fastness tests to the AATCC Gray Scale, supra, for assessing color change. The numbers signify: 5 = excellent; 4 = good; 3 = fair; 2 = poor; 1 = very poor

EXAMPLE 5

Samples of 320/96 polyester textured yarn which had been knitted into tubes and scoured as in example 1 were padded with isopropyl alcohol solutions of di-cis-9-octadecaenoic amine in one case and dicocoamine in another case to give 0%, 0.25%, 0.50%, 1.0% and 2.0% were determined by measuring on the Hunter Color Difference Meter as in Example 1. K/S values were calculated from the Hunter Color Difference L* values as in Example 1, and indigo dye percentages for each original dyed and washed 1, 2, 3, 4 and 5 times were calculated relative to the original indigo dyed cotton control. These dye percentages relative to the original indigo dyed cotton are given in Table 5.

Also, FIG. 1 shows the original indigo dyeings and the indigo dye remaining after washing for cotton and untreated polyester along with the percent indigo remaining curves for di-cis-9-octadecaenoic amine and dicoco amine at 2.0% by weight level for 1, 2, 3, 4 and 5 washings.

TABLE 5

% INDIGO DYE RELATIVE TO INDIGO DYED COTTON-
AATCC TEST METHOD 61-1980, TEST NO. IIA

|  | DYED | WASH #1 | WASH #2 | WASH #3 | WASH #4 | WASH #5 |
|---|---|---|---|---|---|---|
| Cotton Control | 100 | 60.1 | 56.3 | 53.1 | 50.3 | 48.7 |
| Polyester Control | 41.6 | 16.9 | 15.4 | 13.9 | 11.7 | 11.4 |
| 2% Armeen 2-0l/IPA | 57.5 | 47.5 | 42.1 | 40.6 | 37.1 | 34.9 |
| 1% Armeen 2-0l/IPA | 48.7 | 48.5 | 40.6 | 39.4 | 32.7 | 31.5 |
| >0.5% Armeen 2-0/IPA (dioleylamine) | 57.5 | 40.6 | 30.0 | 25.1 | 23.3 | 18.2 |
| 0.25% Armeen 2-0/IPA | 41.6 | 25.0 | 18.5 | 15.4 | 14.4 | 12.7 |
| 2% Armeen 2C/IPA | 55.7 | 46.8 | 44.8 | 35.6 | 31.0 | 27.4 |
| 1% Armeen 2C/IPA | 43.3 | 39.7 | 26.9 | 25.9 | 24.3 | 22.7 |
| 0.5% Armeen 2C/IPA (dicocoamine) | 40.0 | 33.9 | 26.3 | 23.6 | 19.0 | 15.6 |
| 0.25% Armeen 2C/IPA | 45.4 | 23.1 | 20.0 | 17.4 | 14.4 | 12.6 |
| 2% DC 5700/IPA | 78.7 | 21.4 | 20.1 | 20.1 | 18.8 | 18.2 |
| 1% DC 5700/IPA | 64.6 | 21.9 | 19.3 | 18.0 | 15.9 | 15.1 |
| 0.5% DC 5700/IPA | 61.4 | 27.9 | 21.9 | 18.3 | 16.8 | 15.7 |
| 0.25% DC 5700/IPA | 45.0 | 27.6 | 23.7 | 20.2 | 18.5 | 17.5 |
| 2% Armeen 2-0/0.5% PEG 600 Monolaurate | 47.2 | 43.9 | 37.5 | 33.0 | 30.9 | 28.2 |
| 1% Armeen 2-0/0.25% PEG 600 Monolaurate | 42.2 | 33.4 | 24.4 | 24.3 | 20.1 | 19.4 |
| 0.5% Armeen 2-0/0.125% PEG 600 Monolaurate | 63.6 | 29.4 | 26.2 | 25.1 | 20.6 | 18.3 |
| 0.25% Armeen 2-0/0.06% PEG 600 Monolaurate | 32.4 | 21.8 | 18.2 | 16.4 | 11.3 | 11.2 |
| 2% Armeen 2-0/0.5% PLURONIC P94 TM | 48.9 | 43.7 | 41.3 | 39.1 | 31.6 | 31.5 |

IPA = isopropyl alcohol
PEG 600 Monolaurate is polyethylene glycol emulsions

TABLE 6

$R_1-N\begin{matrix}R_2\\ \\R_3\end{matrix}$ for Compounds

| | $R_1$ | $R_2$ | $R_3$ | Chemical Name Trade Name | Initial* Indigo Dye ability | Dye Fastness Properties (Relative to Cotton) | | |
|---|---|---|---|---|---|---|---|---|
| | | | | | | (II-A) Washfastness | (16E-1981) Lightfastness | (116-1977) Crockfastness |
| 1. | — | — | — | homopolyester control | 0.30 | significantly poorer | significantly poorer | comparable |
| 2. | $nC_8H_{17}$ | $nC_8H_{17}$ | H | dioctyl amine | 0.22 | significantly poorer | significantly poorer | comparable |
| 3. | $nC_{10}H_{21}$ | $nC_{10}H_{21}$ | H | di-n-decylamine | 0.38 | comparable | poorer | comparable |
| 4. | $nC_{10}H_{21}$ | $nC_{10}H_{21}$ | $CH_3$ | methyldidecylamine | 0.32 | significantly poorer | significantly poorer | comparable |
| 5. | $nC_{12}H_{25}$ | $nC_{12}H_{25}$ | H | didodecylamine (Armeen 2-12 TM) | 0.30 | slightly poorer | slightly poorer | comparable |
| 6. | $nC_{12}H_{25}$ | $nC_{12}H_{25}$ | $CH_3$ | methyldidodeclyamine (Armeen M2-12 TM) | 0.53 | comparable | slightly poorer | comparable |
| 7. | $nC_{12}H_{25}$ (COCO) | $nC_{12}H_{25}$ (COCO) | H | dicocoamine (Armeen 2C TM) | 0.53 | slightly better | comparable | comparable |
| 8. | $nC_{12}H_{25}$ (COCO) | $nC_{12}H_{25}$ (COCO) | $CH_3$ | methyldicocoamine (Armeen M2C TM) | 0.57 | comparable | poorer | comparable |
| 9. | $nC_{12}H_{25}$ | $nC_{12}H_{25}$ | $nC_4H_9$ | n-butyldidodecylamine | 0.52 | poorer | slightly poorer | comparable |
| 10. | $nC_{12}H_{25}$ (COCO) | $ISOC_8H_{17}$ | H | iso-octylcocoamine (Armeen CL8 TM) | 0.40 | poorer | significantly poorer | comparable |
| 11. | $nC_{12}H_{25}$ | $nC_{12}H_{25}$ | $nC_{12}H_{25}$ | tridodecylamine | 0.47 | slightly poorer | poorer | comparable |
| 12. | $nC_{12}H_{25}$ | $CH_2(CH_3)CNO_2$ | H | dodecylnitrobutylamine | 0.52 | poorer | slightly poorer | comparable |
| 13. | $nC_{12}H_{25}$ | $nC_{12}H_{25}$ | $C_2H_4CH_2NH_2$ | didodecylamino propane (Duomeen 2C TM) | 0.51 | slightly better | poorer | comparable |
| 14. | n-$C_{12}H_{25}$ | $CH_2CH_2CN$ | H | cyanoethylated cocoamine | 0.34 | significantly poorer | significantly poorer | comparable |
| 15. | $nC_{12}H_{25}$ (COCO) | C₆H₅CH₂ | H | benzylcocoamine | 0.34 | significantly poorer | significantly poorer | comparable |
| 16. | C₆H₅CH₂ | C₆H₅CH₂ | H | dibenzylamine | 0.23 | significantly poorer | significantly poorer | comparable |
| 17. | C₆H₅CH₂ | C₆H₅CH₂ | $CH_3$ | N—N—dibenzyl-methylamine | 0.36 | slightly better | slightly poorer | comparable |

TABLE 6-continued $R_1-N\begin{smallmatrix}R_2\\\\R_3\end{smallmatrix}$ for Compounds

| | $R_1$ | $R_2$ | $R_3$ | Chemical Name Trade Name | Initial* Indigo Dye ability | Dye Fastness Properties (Relative to Cotton) | | |
|---|---|---|---|---|---|---|---|---|
| | | | | | | (II-A) Washfastness | (16E-1981) Lightfastness | (116-1977) Crockfastness |
| 18. | $nC_{12}H_{25}$ | (furfuryl: furan-CH2) | H | dodecylfurfurylamine | 0.37 | significantly poorer | significantly poorer | comparable |
| 19. | $nC_{13}H_{27}$ | $nC_{13}H_{27}$ | H | di-N—tridecylamine | 0.30 | significantly poorer | significantly poorer | comparable |
| 20. | $nC_{14}H_{29}$ | $nC_{14}H_{29}$ | H | ditetradecylamine | 0.31 | comparable | comparable | comparable |
| 21. | $nC_{14}H_{29}$ | $nC_{14}H_{29}$ | $CH_3$ | methylditetradecylamine | 0.50 | slightly poorer | slightly poorer | comparable |
| 22. | $nC_{16}H_{33}$ | $nC_{16}H_{33}$ | H | dihexadecylamine (Armeen 2-16 TM) | 0.38 | slightly poorer | comparable | comparable |
| 23. | $nC_{16}H_{33}$ | $nC_{16}H_{33}$ | $CH_3$ | methyldihexadecylamine (Armeen M2-16 TM) | 0.62 | slightly poorer | slightly poorer | comparable |
| 24. | $nC_{18}H_{37}$ | $nC_{18}H_{37}$ | H | dioctadecylamine (Armeen 2-18 TM) | 0.41 | significantly poorer | significantly poorer | comparable |
| 25. | $nC_{18}H_{37}$ | $nC_{18}H_{37}$ | $CH_3$ | methyldioctadecylamine (Armeen M2-18 TM) | 0.52 | slightly poorer | significantly poorer | comparable |
| 26. | $nC_{18}H_{37}$ (tallow) | $nC_{18}H_{37}$ (tallow) | H | ditallowalkylamine | 0.54 | slightly better | much poorer | comparable |
| 27. | $nC_{18}H_{37}$ (tallow) | $nC_{18}H_{37}$ (tallow) | $CH_3$ | methylditallowalkylamine | 0.56 | comparable | much poorer | comparable |
| 28. | $nC_{18}H_{37}$ (hydrogenated tallow) | $nC_{18}H_{37}$ | H | di(hydrogenated tallow) amine | 0.32 | slightly better | slightly poorer | comparable |
| 29. | $nC_{18}H_{35}$ (oleyl) | $nC_{18}H_{35}$ (oleyl) | H | dioleylamine (Armeen 2-O TM) | 0.79 | slightly better | comparable | comparable |
| 30. | $nC_{18}H_{35}$ (oleyl) | $nC_{18}H_{35}$ (oleyl) | $CH_3$ | methyldioleylamine (Armeen M2O TM) | 0.51 | poorer | significantly poorer | comparable |
| 31. | $nC_{18}H_{37}$ | $nC_{18}H_{37}$ | $n$-$C_4H_9$ | n-butyldioctadecylamine | 0.59 | comparable | slightly poorer | comparable |
| 32. | $nC_{18}H_{37}$ (tallow) | $nC_{18}H_{37}$ (tallow) | $C_2H_4CH_2NH_2$ | ditallowaminopropane (Duomeen 2T TM) | 0.50 | better | comparable | comparable |
| 33. | $nC_{18}H_{37}CO$ | H | | octadecaamide (Armid 18 TM) | 0.30 | — | — | — |
| 34. | $nC_{18}H_{37}$ (tallow) | $CH_2CH_2CN$ | H | cyanoethylatedtallowamine | 0.47 | significantly poorer | significantly poorer | comparable |
| 35. | $nC_{18}H_{37}$ | (iso)$C_4H_9$ | H | isobutyloctadecylamine | 0.50 | significantly poorer | poorer | comparable |
| 36. | $nC_{18}H_{37}$ | (iso)$C_4H_9$ | $CH_3$ | methylisobutyloctadecyl-amine | 0.47 | significantly poorer | significantly poorer | comparable |
| 37. | $nC_{18}H_{37}$ (tallow) | (iso)$C_8H_{17}$ | H | iso-octyltallowamine (Armeen TL8 TM) | 0.61 | comparable | slightly poorer | comparable |
| 38. | $nC_{18}H_{37}$ (tallow) | (iso)$C_8H_{17}$ | $CH_3$ | methyliso-octyltallowamine | 0.58 | slightly poorer | poorer | comparable |

The figures for indigo dyeability are relative to 1.00 for cotton and have been derived from K/S values which were calculated from Hunter Color Difference Meter L* values. K/S values are proportional to dye content.

TABLE 7

INDIGO DYEABILITY OF VARIOUS AMINE COMPOUNDS ON POLYESTER RELATIVE TO 1.00 FOR COTTON - $R_1N\begin{smallmatrix}R_2\\\\R_3\end{smallmatrix}$

| SECONDARY AMINES | | | | Tertiary With $CH_3$ as $R_3$ Dyeability | Less Pure Secondary | | Hydrogenated Dyeability | Tertiary With $CH_3$ as $R_3$ Dyeability | Enoic Unsaturated Secondary | | Tertiary With $CH_3$ as $R_3$ Dyeability |
|---|---|---|---|---|---|---|---|---|---|---|---|
| $R_1$ | $R_2$ | $R_3$ | Dye-ability | | Compound | Dye-ability | | | Compound | Dye-ability | |
| $nC_8H_{17}$ | $nC_8H_{17}$ | H | 0.22 | — | — | — | — | — | — | — | — |
| $nC_{10}H_{21}$ | $nC_{10}H_{21}$ | H | 0.38 | 0.32 | — | — | — | — | — | — | — |
| $nC_{12}H_{25}$ | $nC_{12}H_{25}$ | H | 0.30 | 0.53 | $nC_8$–$C_{18}$ (dicoco) | 0.53 | — | 0.57 | — | — | — |
| $nC_{13}H_{27}$ | $nC_{13}H_{27}$ | H | 0.30 | — | — | — | — | — | — | — | — |
| $nC_{14}H_{29}$ | $nC_{14}H_{29}$ | H | 0.31 | 0.50 | — | — | — | — | — | — | — |
| $nC_{16}H_{33}$ | $nC_{16}H_{33}$ | H | 0.38 | 0.62 | — | — | — | — | — | — | — |
| $nC_{18}H_{37}$ | $nC_{18}H_{37}$ | H | 0.41 | 0.52 | $nC_{12}$–$C_{18}$ (ditallow) | 0.54 | 0.32 | 0.56 | $nC_{16}$–$C_{18}$ (dioleyl) | 0.79 | 0.51 |
| 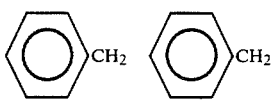 | | H | 0.23 | 0.36 | — | — | — | — | — | — | — |

TABLE 8

| EFFECT OF $R_3$ CHAIN LENGTH | | | |
|---|---|---|---|
| $R_1$ & $R_2$ = n-$C_{12}H_{25}$ | | $R_1$ & $R_2$ = n-$C_{18}H_{37}$ | |
| $R_3$ | Dyeability | $R_3$ | Dyeability |
| H | 0.30 | H | 0.41 |
| $CH_3$ | 0.53 | $CH_3$ | 0.52 |
| n-$C_4H_9$ | 0.52 | n-$C_4H_9$ | 0.59 |
| n-$C_{12}H_{25}$ | 0.47 | — | — |
| $C_3H_6NH_2$ | 0.51 | $C_3H_6NH_2$ | 0.50 |

TABLE 9

| AMINES OF MIXED CHAIN LENGTHS | | | | | |
|---|---|---|---|---|---|
| $R_1$ = n-$C_{12}H_{25}$ | | | $R_1$ = n-$C_{18}H_{37}$ | | |
| $R_2$ | $R_3$ | Dyeability | $R_2$ | $R_3$ | Dyeability |
| Iso $C_8H_{17}$ | H | 0.40 | Iso $C_4H_9$ | H | 0.50 |
| $CH_2(CH_3)_2CNO_2$ | H | 0.52 | Iso $C_4H_9$ | $CH_3$ | 0.47 |
| $CH_2CH_2CN$ | H | 0.34 | Iso $C_8H_{17}$ | H | 0.61 |
| ⟨furyl⟩$CH_2$ | H | 0.37 | Iso $C_8H_{17}$ | $CH_3$ | 0.58 } $R_1$ = $C_{12}$–$C_{18}$ (tallow) |
| ⟨phenyl⟩$CH_2$ | H | 0.34 | $CH_2CH_2CN$ | H | 0.47 |
| | | | H | H | 0.30 - $R_1$ = $C_{18}H_{37}CO$ |

I claim:

1. An indigo-dyeable polyester fiber, comprising a polyester fiber which has had applied to its surface an amount of a suitable indigo dye retaining compound effective to provide said polyester fiber with indigo fading properties similar to cotton, wherein said compound is ditetradecylamine.

2. An indigo-dyeable polyester fiber, comprising:
a polyester fiber which has had applied to its surface an amount of a suitable indigo dye retaining compound effective to provide said polyester fiber with indigo fading properties generally similar to cotton, said compound comprising one or more monomers, each monomer having the formula:

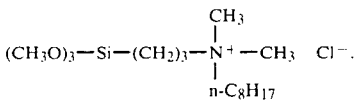

* * * * *